US006944666B2

(12) United States Patent
Belkin

(10) Patent No.: US 6,944,666 B2
(45) Date of Patent: Sep. 13, 2005

(54) MECHANISM FOR ENABLING CUSTOMIZED SESSION MANAGERS TO INTERACT WITH A NETWORK SERVER

(75) Inventor: Ruslan Belkin, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 105 days.

(21) Appl. No.: 10/665,637

(22) Filed: Sep. 18, 2003

(65) Prior Publication Data

US 2004/0064564 A1 Apr. 1, 2004

Related U.S. Application Data

(62) Division of application No. 09/524,775, filed on Mar. 14, 2000, now Pat. No. 6,701,367.
(60) Provisional application No. 60/156,305, filed on Sep. 24, 1999, and provisional application No. 60/155,711, filed on Sep. 24, 1999.

(51) Int. Cl.[7] .............................................. G06F 15/16
(52) U.S. Cl. ....................................... 709/227; 709/228
(58) Field of Search ................................. 709/227, 228, 709/229, 230, 231

(56) References Cited

U.S. PATENT DOCUMENTS

| 5,329,589 | A | | 7/1994 | Fraser et al. |
| 5,410,698 | A | | 4/1995 | Danneels et al. |
| 5,530,852 | A | | 6/1996 | Meske, Jr. et al. |
| 5,544,320 | A | * | 8/1996 | Konrad ........................ 709/203 |
| 5,586,312 | A | | 12/1996 | Johnson et al. |
| 5,594,921 | A | * | 1/1997 | Pettus ........................... 710/11 |
| 5,642,515 | A | * | 6/1997 | Jones et al. .................. 710/220 |
| 5,691,973 | A | | 11/1997 | Ramstrom et al. |
| 5,721,908 | A | * | 2/1998 | Lagarde et al. ............... 707/10 |
| 5,752,031 | A | | 5/1998 | Cutler et al. |
| 5,790,790 | A | | 8/1998 | Smith et al. |
| 5,793,415 | A | | 8/1998 | Gregory, III et al. |

(Continued)

OTHER PUBLICATIONS

Sebastian Wilhelmi, "Re: (ORBit–mt–0.5.7)g_main_iterate0: main loop already active in another thread," Jan. 28, 2002, http://mail.gnome.org/archives/orbit–list/2002–January/msg00152.html, printed Oct. 21, 2002, 2 pages.
Sumedh Mungee, "Online CORBA documents," http://www.cs.wustl.edu/~schmidt/CORBA–docs/, printed Oct. 21, 2002, 3 pages.
"System for Dispatching from Multiple Thread Pools," Jan. 1, 1998, IBM Technical Disclosure Bulletin, vol. 41, issue No. 1, pp. 329–332.

Primary Examiner—Gertrude A. Jeanglaude
(74) Attorney, Agent, or Firm—Hickman Palermo Troung & Becker, LLP

(57) ABSTRACT

A mechanism for enabling customized session managers to interact with a network server is disclosed. A programming interface enables customized session managers to "plug in" to and to interact with the server, making it possible to change session management functionality without having to make any changes to the core server. It also makes it possible to incorporate multiple session managers into the server. These aspects of the programming interface significantly increase the flexibility and scalability of the web server. The mechanism further includes a service engine for coordinating the interaction with the session managers. For each client request, the service engine determines which application needs to be invoked. Then, based upon that application, the service engine determines which, if any, associated session manager needs to be invoked to manage session (i.e. state) information for that application. The service engine invokes the session manager via the programming interface.

18 Claims, 4 Drawing Sheets

U.S. PATENT DOCUMENTS

| | | | |
|---|---|---|---|
| 5,796,393 A | 8/1998 | MacNaughton et al. |
| 5,809,145 A | 9/1998 | Slik et al. |
| 5,809,248 A | 9/1998 | Vidovic |
| 5,835,724 A | 11/1998 | Smith |
| 5,872,963 A | 2/1999 | Bitar et al. |
| 5,913,029 A | 6/1999 | Shostak |
| 5,918,228 A | 6/1999 | Rich et al. |
| 5,928,323 A | 7/1999 | Gosling et al. |
| 5,961,584 A | 10/1999 | Wolf |
| 5,991,792 A | 11/1999 | Nageswaran |
| 6,012,090 A | 1/2000 | Chung et al. |
| 6,014,666 A | 1/2000 | Helland et al. |
| 6,052,711 A | 4/2000 | Gish |
| 6,058,460 A | 5/2000 | Nakhimovsky |
| 6,076,108 A | 6/2000 | Courts et al. |
| 6,088,728 A | 7/2000 | Bellemore et al. |
| 6,098,093 A | 8/2000 | Bayeh et al. |
| 6,112,196 A | 8/2000 | Zimowski et al. |
| 6,125,382 A | 9/2000 | Brobst et al. |
| 6,128,644 A | 10/2000 | Nozaki |
| 6,141,684 A | 10/2000 | McDonald et al. |
| 6,163,801 A | 12/2000 | O'Donnell et al. |
| 6,182,109 B1 | 1/2001 | Sharma et al. |
| 6,209,018 B1 | 3/2001 | Ben-Shachar et al. |
| 6,237,024 B1 | 5/2001 | Wollrath et al. |
| 6,249,844 B1 | 6/2001 | Schloss et al. |
| 6,253,239 B1 | 6/2001 | Shklar et al. |
| 6,260,077 B1 | 7/2001 | Rangarajan et al. |
| 6,266,661 B1 | 7/2001 | Lewish et al. |
| 6,304,967 B1 | 10/2001 | Braddy |
| 6,314,093 B1 | 11/2001 | Mann et al. |
| 6,317,742 B1 | 11/2001 | Nagaratnam et al. |
| 6,336,135 B1 | 1/2002 | Niblett et al. |
| 6,338,064 B1 | 1/2002 | Ault et al. |
| 6,343,328 B1 | 1/2002 | Murphy, Jr. et al. |
| 6,374,286 B1 | 4/2002 | Gee et al. |
| 6,377,999 B1 | 4/2002 | Bartas |
| 6,393,477 B1 | 5/2002 | Paxhia et al. |
| 6,397,253 B1 | 5/2002 | Quinlan et al. |
| 6,415,329 B1 | 7/2002 | Gelman et al. |
| 6,418,458 B1 | 7/2002 | Maresco |
| 6,490,624 B1 | 12/2002 | Sampson et al. |
| 6,542,920 B1 | 4/2003 | Belkin et al. |
| 6,549,996 B1 | 4/2003 | Manry, IV et al. |
| 6,557,038 B1 | 4/2003 | Becker et al. |
| 6,564,252 B1 | 5/2003 | Hickman et al. |
| 6,604,125 B1 | 8/2003 | Belkin |
| 6,629,130 B2 | 9/2003 | Mertama et al. |
| 6,701,367 B1 * | 3/2004 | Belkin ........................ 709/227 |

* cited by examiner

Session Manager Abstract Class ⟋ 130

- Init
- CreateSession
- DeleteSession
- GetSession
- PutValue
- GetValue
- Update
- Reaper

*Fig. 2*

Session Object Class ⟋ 302

- PutValue
- GetValue
- GetAccessTime
- IsValid

*Fig. 3*

MECHANISM FOR ENABLING CUSTOMIZED SESSION MANAGERS TO INTERACT WITH A NETWORK SERVER

RELATED APPLICATIONS

This application is a divisional of U.S. application Ser. No. 09/524,775, now U.S. Pat. No. 6,701,367, filed Mar. 14, 2000, which claims the benefit of priority to U.S. Provisional Application entitled "Web Server Architecture", Ser. No. 60/156,305, filed Sep. 24, 1999, and U.S. Provisional Application entitled "Web Server Architecture", Ser. No. 60/155, 711, filed Sep. 24, 1999. The entire contents of these applications are hereby incorporated by reference.

BACKGROUND

This invention relates generally to computer systems, and more particularly to a mechanism for enabling a customized session manager to interact with a network server.

On the Internet or World Wide Web, information is generally communicated on a request-response basis. That is, a client (typically running a browser program) submits a service request to a server. The service request may simply ask for a static page (usually in HTML format), or it may request that a particular application or program be executed to generate a return page. In response to the service request, the server performs whatever tasks are necessary to service the request, and provides a return page to the client. This request-response sequence, referred to as a "roundtrip", is carried out for each request.

Generally, the Internet is a stateless environment. That is, each service request is treated as its own individual request, and there is no "memory" of prior requests. Put another way, the server makes no association between a current request and a previous request, even if the requests are from the same client, and even if the requests have some common nexus. For simple applications in which every task that needs to be performed can be carried out in a single roundtrip, this statelessness is not a problem. However, for exchanges (such as transactions) that require multiple roundtrips, the lack of state presents a significant impediment.

An example of an application in which it is necessary to maintain state across multiple roundtrips is that of an "electronic shopping cart" application. More specifically, a user visits a merchant's website using a particular client machine. As the user peruses the website, he sees an item that he wishes to purchase, and puts that item into his "shopping cart". As some point, the user invokes a link to another page of the website, and at that point, a request is sent to the server which requests the desired page and which also provides to the server all of the items currently in the shopping cart. The server responds to the request by storing information pertaining to the shopping cart items, and by providing the desired page to the client. Thereafter, the user peruses the new page and puts additional items into the shopping cart. In a subsequent request by the client, the additional items in the shopping are sent to the server. Since the subsequent request is from the same client, the server should associate the additional items with the previous items as being in the same shopping cart. To do this, though, the server needs to associate the subsequent request with the previous request, which in turn requires that the server maintain state information relating to the requests. However, as noted above, the Internet is generally a stateless environment. As a result, without further functionality on the part of the server, multiple roundtrip exchanges, such as those required by the electronic shopping cart application, cannot be implemented on the Internet.

To enable exchanges which require multiple roundtrips, some servers implement a session management functionality. Basically, this functionality maintains state information across multiple roundtrips so that associations between multiple requests can be made. Usually, state information is maintained by passing session ID information back and forth between the client and the server. For example, when a service on the server requiring state information is first invoked by a client request, a new session is created, and a new session ID is associated with the new session. The session acts as a "container" that can be used to store all of the necessary state information relating to that particular session. Once the session is created (and possibly updated to include state information relating to processing of the current request), the associated session ID is provided to the client that requested the service. If that client makes a subsequent request to the same service, the client includes in that request the session ID. Using the session ID, the server accesses the associated session, and based upon the state information stored in the associated session, the server can determine what has transpired thus far. In this manner, the server is able to associate a current request with one or more previous requests.

Typically, the session management functionality of a server is an integral part of the server. This means that in order to make any changes to the session management functionality, it is necessary to change and to recompile the core server code. While this simplifies the overall architecture of the server, it can lead to significant drawbacks, such as inflexibility and non-scalability. Both of these limit the overall effectiveness of the server. As a result, there is a need for an improved session management architecture.

SUMMARY OF THE INVENTION

In light of the shortcomings of the prior art, the present invention provides an improved session management mechanism which enables customized session managers to interact with a network server. In accordance with the present invention, there is provided a programming interface which enables customized session managers to "plug in" to and to interact with the server. In one embodiment, the programming interface takes the form of an abstract class definition, and each customized session manager is a subclass of the abstract class. Each customized session manager can provide a customized method implementation for each method defined by the abstract class.

This programming interface makes it possible to change session management functionality without having to make any changes to the core server. More specifically, to change session management functionality, all that needs to be done is to alter the code for a particular session manager and to recompile that session manager. The server code does not need to be altered or recompiled. This significantly increases the flexibility of the server. In addition, the programming interface makes it possible to incorporate multiple session managers into the server. Each session manager can be assigned to a certain set of applications, and each session manager can manage sessions in its own customized fashion. The ability to incorporate multiple session managers into the server significantly increases the flexibility and scalability of the server.

In addition to the programming interface, the present invention further provides a service engine for coordinating the interaction with the session managers. More specifically, for each client request, the service engine determines which application needs to be invoked. Then, based upon that application, the service engine determines which, if any, associated session manager needs to be invoked to manager session (i.e. state) information for that application. The service engine invokes the session manager via the programming interface. With the programming interface and the service engine, the present invention provides a flexible and scalable mechanism for implementing session management functionality in a network server.

BRIEF DESCRIPTION OF THE DRAWINGS

FIG. 2 is a diagrammatic representation of one embodiment of the session management API of the present invention.

FIG. 3 is a diagrammatic representation of one embodiment of a session object class which may be used in connection with the present invention.

DETAILED DESCRIPTION OF EMBODIMENT(S)

Figure 1:
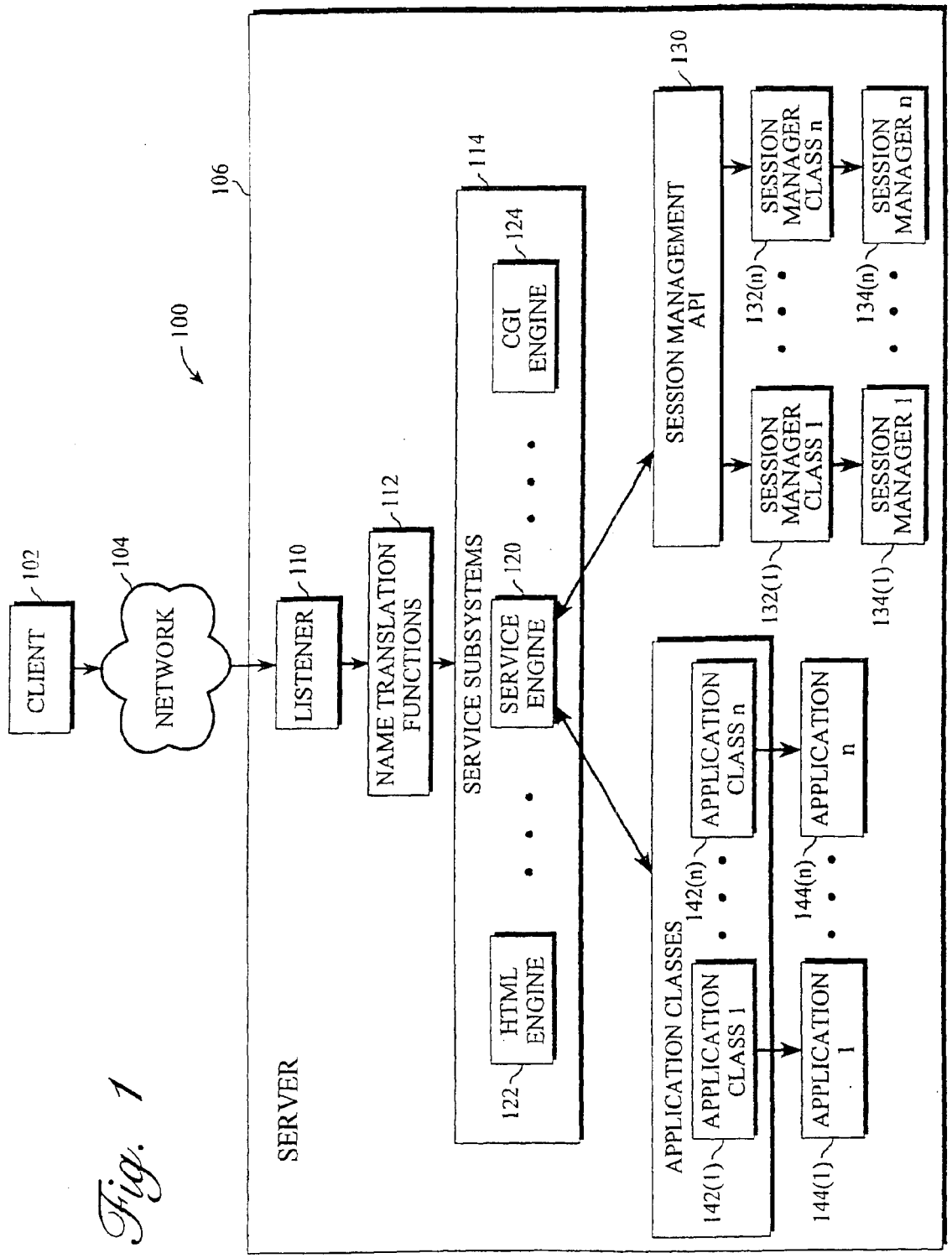
FIG. 1 is a functional block diagram of a system in which one embodiment of the present invention may be implemented.

With reference to FIG. 1, there is shown a functional block diagram of a system 100 in which one embodiment of the present invention may be implemented, the system comprising a client 102, a network 104, and a server 106. For the sake of simplicity, only one client 102 is shown; however, it should be noted that multiple clients 102 may communicate with the server 106 via the network 104. For purposes of the present invention, the client 102 may be any mechanism capable of communicating with the server 104, including but not limited to a computer running a browser program. The client 102 may communicate with the server using any known protocol, including but not limited to HTTP and FTP. The network 104 may be any type of network, including but not limited to a local area network and a wide area network such as the Internet. The network 104 may even be as simple as a direct connection. Any mechanism capable of facilitating communication between the client 102 and the server 106 may serve as the network 104.

The server 106 is the component responsible for providing most of the functionality of the system 100. More specifically, the server 106 receives requests from the client 102 and responds to the requests by providing response pages. The response pages may be derived by simply accessing static files, or by executing one or more applications to dynamically generate the response pages. The term application is used broadly herein to refer to any type of program or routine (e.g. Java servlets) that is capable of performing one or more particular functions. What actions need to be carried out by the server 106 to derive the response pages is typically specified in the requests. Each request-response sequence is referred to as a roundtrip.

In one embodiment, the server 106 comprises a listener 110, a set of name translation functions 112, and a set of service subsystems 114. The primary function of the listener 110 is to receive a client request, parse the request into its various components (e.g. method, headers, universal resource identifier (URI), parameters, etc.), and store the various components into predefined structures. Once the request is parsed, it is ready for processing by the other components of the server 106.

In particular, the name translation functions 112 determine, based upon the URI of the request, which of the service subsystems 114 need to be invoked in response to the request. In one embodiment, there is a name translation function associated with each of the subsystems 120, 122, 124 in the service subsystems 114. These name translation functions are executed in turn to determine which subsystem 120, 122, 124 needs to be invoked to process the request. For example, the name translation function associated with the HTML engine 122 is invoked to determine whether the HTML engine 122 needs to be invoked to respond to the request. If not, then the name translation function associated with the service engine 120 is invoked to determine whether the service engine 120 needs to be invoked to respond to the request. This process of executing the name translation functions 112 continues until it is determined which of the service subsystems 114 needs to be invoked to process the request. Once the proper subsystem is determined, processing of the request continues with that subsystem.

As shown in FIG. 1, one of the service subsystems is the service engine 120. In one embodiment, the service engine 120 coordinates interaction between the applications 144 and the session managers 134 to manage session (i.e. state) information for exchanges that span multiple client requests. In carrying out its coordination function, the service engine 120 performs at least three major functions. First, it determines based upon the URI of the client request which application class 142 needs to be invoked to process the client request. Then, it invokes the proper application class 142 to give rise to an application instance 144. Thereafter, based upon the application class 142, the service engine 120 determines which session manager 134 to invoke to manager session information for that application class instance 144, and then invokes that session manager 134. Once that is done, the application instance 144 and the session manager 134 interact with each other to access and to update session information relating to a particular session.

To enable the service engine 120 to determine which application class 142 to invoke in response to a particular URI, each application class 142 is registered when it is incorporated into the server 106. In one embodiment, this registration takes the form of an entry in a configuration file. This entry comprises a reference to a particular application class 142, and a URI associated with that class 142. Given this information, the service engine 120 can determine, based upon the URI of the request, which application class 142 to invoke to service the request. In addition to this information, each entry may further comprise a context name and the name of the session manager 134 associated with that context. The context name allows multiple application classes 142 to be grouped together for purposes of session management so that the same session manager 134 can be invoked to manage session information for that group of application classes 142.

To enable the service engine 120 to invoke the one or more session managers 134, there is provided a session management application programming interface (API) 130. In one embodiment, the API 130 takes the form of an abstract class definition which sets forth a set of methods that need to be implemented by subclasses of that abstract class. Since the API 130 is an abstract class, it does not provide any actual implementations for the specified methods. It only specifies the methods themselves. It will be up to the subclasses of the abstract class to provide the actual method implementations.

The session manager classes 132 "plug in" to and interact with the server 106 by way of the API 130. More specifically, in one embodiment, the session manager classes 132 take the form of subclasses of the abstract class which is the API 130. Because each session manager class 132 is a subclass of the abstract class, each session manager class 132 provides an implementation for each method of the abstract class. These method implementations can be different for each session manager class 132. As a result, each session manager class 132 can be customized.

To enable the service engine 120 to determine which session manager class 132 to associate with which application class 142, each session manager class 132 is registered when it is incorporated into the server 106. In one embodiment, this registration takes the form of an entry in a configuration file. This entry comprises a reference to a particular session manager class 132, and either an associated context or a reference to an application class 142. Given this information, the service engine 120 can determine, based upon the application class 142, which session manager class 132 (and hence, which session manager 134) to invoke to manage session information for instances of that application class 142. In one embodiment, each of the session manager classes 132 is instantiated upon system startup to give rise to the session manager instances 134. Since it is the instances 134 that are actually invoked by the service engine 120, this makes the server 106 ready for session management operation from the very outset.

With reference to FIG. 2, there is shown one possible embodiment for the session management API 130. As noted previous, the API 130 takes the form of an abstract class definition. This definition specifies the methods that need to be implemented by the session manager classes 132. These methods include: (1) Init; (2) CreateSession; (3) DeleteSession; (4) GetSession; (5) PutValue; (6) GetValue; (7) Update; and (8) Reaper.

The Init method is called upon initialization of a session manager 134 and is called only once. When invoked, the Init method prepares a session manager instance 134 for normal operation. The CreateSession method is invoked when a new session needs to be created. This typically occurs when a client invokes an application class 142 for the first time. The DeleteSession method is invoked to render an existing session invalid. This may occur at the end of a transaction or when a session "times out". The GetSession method is invoked to access an existing session. This is used to continue an ongoing session. The PutValue method is invoked to write information into an existing session. This is usually invoked to write additional state information into an existing or new session. The GetValue method is invoked to retrieve state information from an existing session. This method makes it possible to ascertain what has transpired thus far in a particular session. The Update method is invoked when current processing of a session is completed. It gives the session manager 134 an opportunity to perform certain functions (such as making the session information persistent in a database) if it wishes. The Reaper method is invoked periodically by an external mechanism (such as a dedicated thread) to cause the session manager 134 to delete old or invalid sessions. This method causes the session manager 134 to perform "clean up" operations on outdated sessions.

In maintaining state information pertaining to sessions, the session managers 134 use session objects. A sample session object class definition 302 is shown in FIG. 3. Unlike the API 130, class definition 302 is an actual class definition, not an abstract class definition; thus, an implementation for each of the specified methods is provided with the object class 302. Two methods defined by the session object class 302 are the PutValue and the GetValue methods. The PutValue method is invoked to write additional information into a session, while the GetValue method is invoked to retrieve information from a session. In one embodiment, the implementations for these methods are straightforward: they invoke the corresponding methods on the appropriate session manager 134. That is, the PutValue method of the session object class 302 invokes the PutValue method of the session manager class 132, and the GetValue method of the session object class 302 invokes the GetValue method of the session manager class 132. Thus, it is the session manager 134 associated with a particular session object instance that actually writes and retrieves information pertaining to a session.

Another method of the session object class 302 is the GetAccessTime method. When invoked, this method returns the time of the last access of a particular session object. This method may be used by a session manager 134 to determine whether a particular session has "timed out". Yet another method of the session object class 302 is the IsValid method. This method is invoked to determine whether a session object is valid and may still be used.

Figure 4:
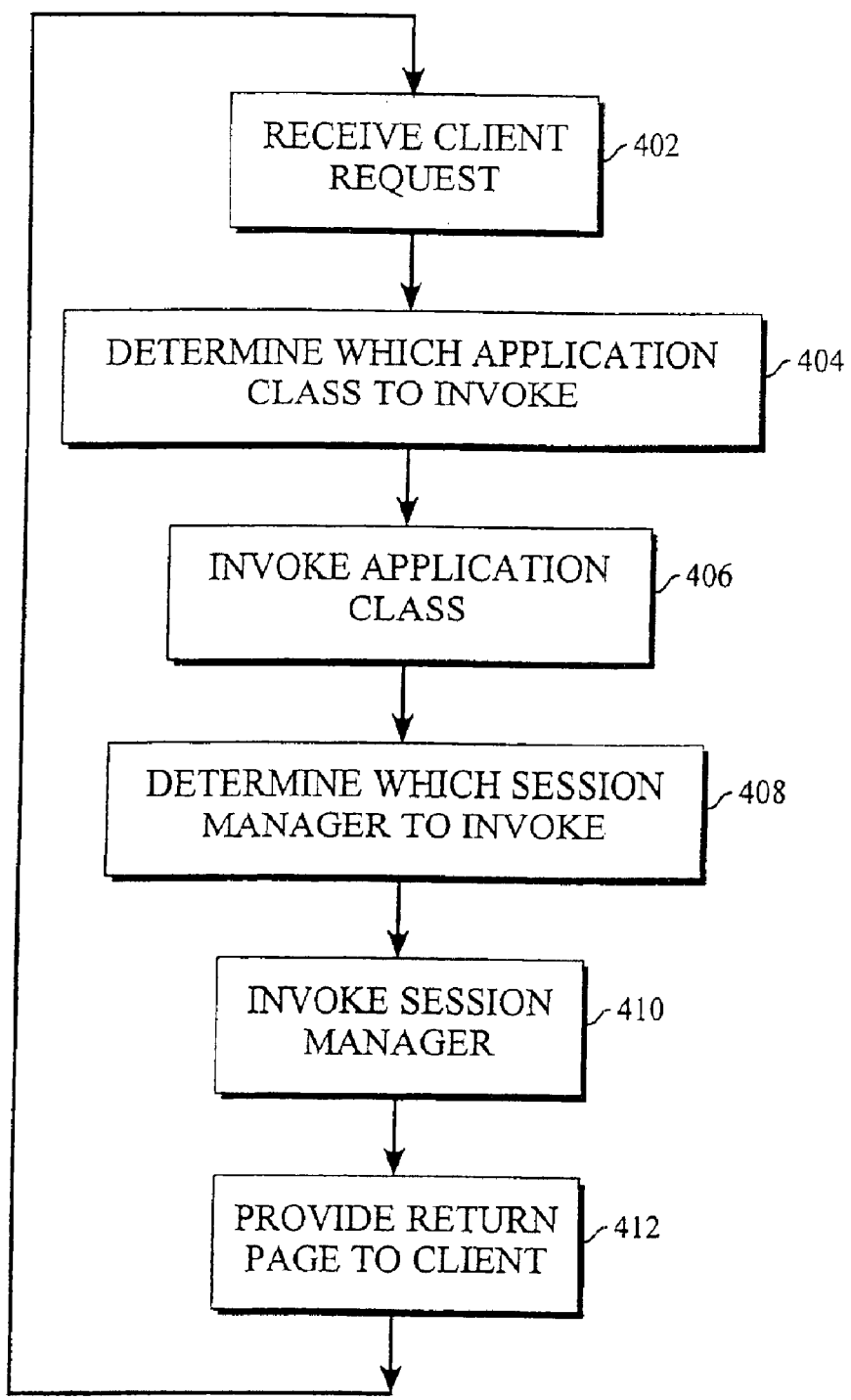
FIG. 4 is an operational flow diagram of the server of FIG. 1.

The structure of the server 106 has been disclosed. With reference to the flow diagram of FIG. 4, the operation of the server 106 will now be described. FIG. 4 presents an overview of the interaction between the service engine 120, the application classes 142, and the session managers 134. Basically, the service engine 120 receives (402) a client request after the request has been parsed by the listener 110 and determined by the name translation functions 112 to be eligible for processing by the service engine 120. This client request may or may not include (as will be explained further below) a session ID. The session ID may be provided as part of the URI, or in the form of a "cookie", or both. Based upon the URI, the service engine 120 determines (404) which of the application classes 142 to invoke to process the request. In one embodiment, this determination is made by consulting the configuration file previously described.

Once the service engine 120 determines the proper application class 142, it invokes (406) the application class 142 to give rise to an application instance 144. The application instance 144 then starts executing to process the client request. If the application instance 144 is of the type that processes exchanges involving multiple roundtrips, and hence, requires session information to be maintained, then one of the first acts of the application instance 144 is to request a session object from the service engine 120. If a session ID was included with the client request (thereby indicating that this client request relates to an already existing session object), then the service engine 120 uses the provided session ID to get the requested session object. If no session ID was included with the client request, then the service engine 120 generates a new session ID.

To get a session object for the application instance 144, the service engine 120 invokes one of the session managers 134. Before it does this, however, the service engine 120 first determines (408) which session manager 134 to invoke. In one embodiment, this determination is made based upon the application class 142. More specifically, using the configuration file described previously, the service engine 120 determines which session manager 134 is associated with the class of the application instance 144. Once the proper session manager 134 is determined, it is invoked (410) by the service engine 120. In one embodiment, the service engine 120 invokes the proper session manager 134 by way of the API 130.

In invoking a session manager 134, the service engine 120 calls one of two methods defined by the API 130 and implemented by the session manager 134. If the service engine 120 just generated a new session ID and, hence, needs a new session object to be created, then the service engine 120 calls the CreateSession method of the proper session manager 134. If the service engine 120 was provided a session ID with the client request, then the service engine 120 calls the GetSession method of the proper session manager 134 to get an already existing session object. With either call, the service engine 120 passes the session ID to the session manager 134.

In response to a CreateSession call, the proper session manager 134: (1) instantiates a new session object; (2) associates the session ID with the new session object; and (3) inserts into the new session object a pointer to itself (the proper session manager 134). Once that is done, the session manager 134 provides a reference to the new session object to the service engine 120. In response to a GetSession call, the session manager 134: (1) determines which already existing session object is associated with the session ID; (2) determines whether that session object is still valid; and (3) if the session object is still valid, provides a reference to the session object to the service engine 120. In response to either call, an object reference is returned to the service engine 120 (unless the session object associated with the session ID is no longer valid).

Once the service engine 120 receives an object reference from the proper session manager 134, it passes the object reference on to the application instance 144. Thereafter, the application instance 144 interacts with the session object referenced by the object reference to access and to update session information relating to that session object. To add session information to the session object, the application instance 144 calls the PutValue method of the session object. To access session information from the session object, the application instance 144 calls the GetValue method of the session object. As noted previously, the PutValue and GetValue methods of the session object call the corresponding PutValue and GetValue methods of the proper session manager 134 (the session object knows which session manager 134 to call because it contains a pointer to the session manager 134 that created it, as discussed above). Thus, it is really the session manager 134 that accesses and updates the session information relating to a session object. Since each session manager 134 can provide a different implementation for the PutValue and GetValue methods, each session manager 134 can maintain session information differently. For example, one session manager 134 may write session information to a persistent storage whereas another may just store the session information in memory. These different implementations can be accommodated by the present invention.

This interaction between the application instance 144, the session object, and the session manager 134 may continue until the application instance 144 completes processing of the client request. At that point, the application instance 144 generates and provides a response page to the service engine 120. In turn, the service engine 120 provides (412) the response page, along with the session ID, to the client 102. The session ID may be provided to the client 102 either in the form of a "cookie", as part of the URI, or both. This session ID is used by the client 102 in future related requests. In addition, the service engine 120 calls the update method of the proper session manager 134 to give the session manager 134 an opportunity to perform any final session management functions. With that done, processing of the client request is complete. Thereafter, the service engine 120 loops back to (402) to process another client request.

The process described above may be used to process different sets of related requests, with each set of requests involving a different application class 142 and a different session manager 134. For example, one set of requests may involve application class 142(1) and session manager 134 (1), while another set of requests may involve application class 142(n) and session manager 134(n). These and other uses are within the scope of the present invention.

At this point, it should be noted that the session management API 130 gives rise to several significant advantages. First, note that to change or to augment session manager functionality, all that needs to be done is to "plug in" and to register another session manager class 132. It is not necessary to change any of the core code of the server. Once registered, the new session manager class 132 can be invoked by the service engine 120. This ability to easily change session management functionality greatly increases the flexibility of the server 106. Also, note that the API 130 makes it possible to accommodate multiple session manager classes 132. Each class 132 can provide customized method implementations and functionality, and each class can be associated with different application classes 142. This ability to accommodate multiple session managers classes 132 significantly increases the flexibility and the scalability of the server 106. Hence, the present invention represents a significant improvement over the prior art.

Hardware Overview

Figure 5:
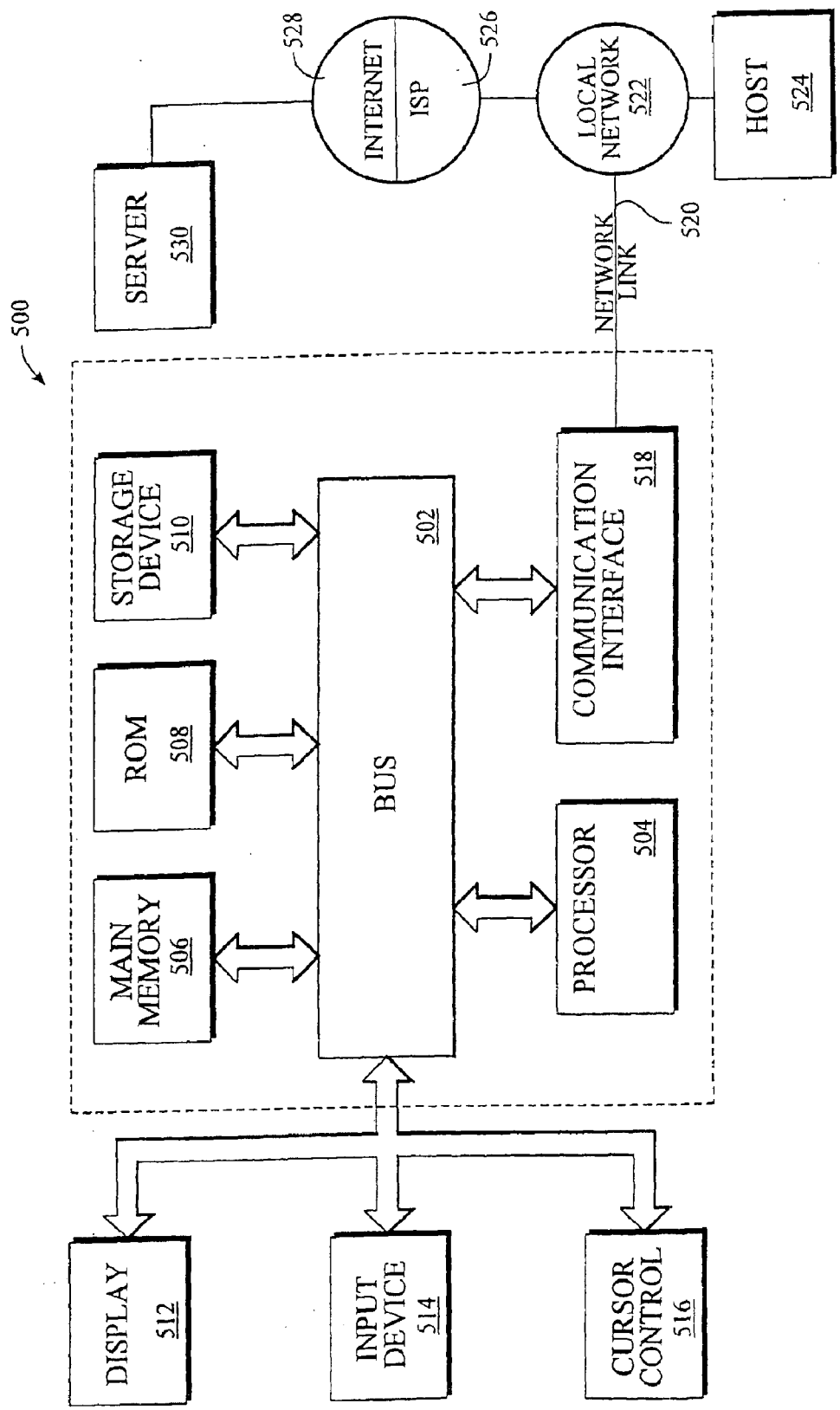
FIG. 5 is a hardware block diagram of a computer system in which the present invention may be implemented.

In one embodiment, the present invention is implemented as a set of instructions executable by one or more processors. The invention may be implemented as part of an object oriented programming system, including but not limited to the Java™ programming system manufactured by Sun Microsystems, Inc. of Mountain View, Calif. FIG. 5 shows a hardware block diagram of a computer system 500 in which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for servicing client requests, comprising:

receiving multiple associated client requests;

in response to each of said associated client requests:
   invoking an application;
   selecting, based upon said application, and from among two or more session managers, a particular session manager to associate with said application; and
   invoking said particular session manager to manage state information for said application across said multiple associated client requests.

2. The method of claim 1, wherein said particular session manager is invoked via a programming interface.

3. The method of claim 2, wherein said programming interface comprises a definition of an abstract class, and wherein said particular session manager is a subclass of said abstract class.

4. The method of claim 3, wherein said particular session manager comprises an implementation for each method defined for said abstract class, and wherein said particular session manager is invoked by invoking a particular method implementation provided by said particular session manager.

5. The method of claim 1, wherein said associated client requests are associated with each other by way of a session ID.

6. The method of claim 1, wherein selecting particular the session manager to associate with said application comprises:

accessing a set of configuration information which one of said two or more specifies which session managers to associate with said application.

7. An apparatus for servicing client requests, comprising:
a mechanism for receiving multiple associated client requests; and
a mechanism for responding to each of said associated client requests by:
  invoking an application;
  selecting, based upon said application, and from among two or more session managers, a particular session manager to associate with said application; and
  invoking said particular session manager to manage state information for said application across said multiple associated client requests.

8. The apparatus of claim 7, wherein said apparatus further comprises a programming interface, and wherein said particular session manager is invoked via said programming interface.

9. The apparatus of claim 8, wherein said programming interface comprises a definition of an abstract class, and wherein said particular session manager is a subclass of said abstract class.

10. The apparatus of claim 9, wherein said particular session manager comprises an implementation for each method defined for said abstract class, and wherein said particular session manager is invoked by invoking a particular method implementation provided by said particular session manager.

11. The apparatus of claim 7, wherein said associated client requests are associated with each other by way of a session ID.

12. The apparatus of claim 7, wherein selecting the particular session manager to associate with said application comprises:
  accessing a set of configuration information which specifies which one of said two or more session managers to associate with said application.

13. A computer readable medium having stored thereon instructions which, when executed by one or more processors, cause the one or more processors to service client requests, said computer readable medium comprising:
  instructions for causing one or more processors to receive multiple associated client requests; and
  instructions for causing one or more processors to respond to each of said associated client requests by:
    invoking an application;
    selecting, based upon said application, and from among two or more session managers, a particular session manager to associate with said application; and
    invoking said particular session manager to manage state information for said application across said multiple associated client requests.

14. The computer readable medium of claim 13, wherein said particular session manager is invoked via a programming interface.

15. The computer readable medium of claim 14, wherein said programming interface comprises a definition of an abstract class, and wherein said particular session manager is a subclass of said abstract class.

16. The computer readable medium of claim 15, wherein said particular session manager comprises an implementation for each method defined for said abstract class, and wherein said particular session manager is invoked by invoking a particular method implementation provided by said session manager.

17. The computer readable medium of claim 13, wherein said associated client requests are associated with each other by way of a session ID.

18. The computer readable medium of claim 13, wherein selecting the particular session manager to associate with said application comprises:
  accessing a set of configuration information which specifies which one of said two or more session manager to associate with said application.

* * * * *

UNITED STATES PATENT AND TRADEMARK OFFICE
CERTIFICATE OF CORRECTION

PATENT NO. : 6,944,666 B2 Page 1 of 1
APPLICATION NO. : 10/665637
DATED : September 13, 2005
INVENTOR(S) : Ruslan Belkin It is certified that error appears in the above-identified patent and that said Letters Patent is hereby corrected as shown below:

Column 10
Claim 6: Line 62, delete "particular the" and insert --the particular--.
　　　　Line 66, delete "specifies which".

Column 12
Claim 18: Line 34, delete "manager" and insert --managers--.

Signed and Sealed this

Sixth Day of March, 2007

JON W. DUDAS
*Director of the United States Patent and Trademark Office*